(12) United States Patent
Paquette et al.

(10) Patent No.: US 7,757,185 B2
(45) Date of Patent: Jul. 13, 2010

(54) ENABLING AND DISABLING HOTKEYS

(75) Inventors: Michael James Paquette, Benicia, CA (US); Eric Charles Schlegel, Redmond, WA (US)

(73) Assignee: Apple Inc., Cupertino, CA (US)

( * ) Notice: Subject to any disclaimer, the term of this patent is extended or adjusted under 35 U.S.C. 154(b) by 437 days.

(21) Appl. No.: 11/327,839

(22) Filed: Jan. 6, 2006

(65) Prior Publication Data

US 2007/0162875 A1      Jul. 12, 2007

(51) Int. Cl.
 *G06F 3/048* (2006.01)
(52) U.S. Cl. .................. 715/827; 715/810; 715/847; 345/168
(58) Field of Classification Search ............. 715/827, 715/847; 345/168
See application file for complete search history.

(56) References Cited

U.S. PATENT DOCUMENTS

| | | | | |
|---|---|---|---|---|
| 5,467,433 A * | 11/1995 | Lamprecht et al. | ......... | 358/1.15 |
| 5,525,978 A * | 6/1996 | York et al. | ..................... | 341/22 |
| 5,867,729 A * | 2/1999 | Swonk | .......................... | 710/8 |
| 5,872,995 A * | 2/1999 | Chaiken | ....................... | 710/5 |
| 6,049,834 A * | 4/2000 | Khabardar et al. | ......... | 709/242 |
| 6,057,845 A * | 5/2000 | Dupouy | ..................... | 715/863 |
| 6,246,405 B1 * | 6/2001 | Johnson | ...................... | 715/764 |
| 6,711,634 B2 * | 3/2004 | Howarth et al. | ............... | 710/33 |
| 6,724,405 B2 * | 4/2004 | Matthews et al. | ........... | 715/773 |
| 6,738,810 B1 * | 5/2004 | Kramer et al. | ................ | 705/40 |
| 6,871,348 B1 * | 3/2005 | Cooper | ........................ | 719/310 |
| 6,934,778 B2 * | 8/2005 | Numano | ....................... | 710/67 |
| 6,959,422 B2 * | 10/2005 | Slaunwhite et al. | ......... | 715/827 |
| 7,099,620 B2 * | 8/2006 | Miller | ......................... | 434/350 |
| 7,134,094 B2 * | 11/2006 | Stabb et al. | ................. | 715/827 |
| 7,161,587 B2 * | 1/2007 | Beck et al. | ................... | 345/168 |
| 7,237,123 B2 * | 6/2007 | LeVine et al. | ............... | 713/193 |
| 7,464,258 B2 * | 12/2008 | Chang | .......................... | 713/1 |
| 7,564,445 B2 * | 7/2009 | Bathiche | ..................... | 345/163 |
| 2002/0156870 A1 * | 10/2002 | Boroumand et al. | ........ | 709/219 |
| 2003/0120997 A1 * | 6/2003 | Saito | .......................... | 714/813 |
| 2003/0159076 A1 * | 8/2003 | Delisle et al. | ............... | 713/300 |
| 2003/0184592 A1 * | 10/2003 | Awada et al. | ............... | 345/788 |
| 2003/0217287 A1 * | 11/2003 | Kruglenko | .................. | 713/200 |
| 2004/0001098 A1 * | 1/2004 | Numano | ..................... | 345/773 |
| 2004/0104893 A1 * | 6/2004 | Huang | ........................ | 345/168 |
| 2004/0179017 A1 * | 9/2004 | Martyn et al. | ............... | 345/536 |
| 2004/0242279 A1 * | 12/2004 | Costanzo et al. | ........... | 455/564 |
| 2005/0052475 A1 * | 3/2005 | Millman et al. | ............. | 345/690 |
| 2005/0190971 A1 * | 9/2005 | Brubacher-Cressman et al. | .......................... | 382/209 |
| 2006/0005142 A1 * | 1/2006 | Karstens | ..................... | 715/802 |
| 2006/0038787 A1 * | 2/2006 | Kuo | ........................... | 345/168 |
| 2006/0129633 A1 * | 6/2006 | Potluri et al. | ............... | 709/203 |
| 2006/0161862 A1 * | 7/2006 | Racovolis et al. | ........... | 715/804 |
| 2007/0052868 A1 * | 3/2007 | Chou et al. | ................. | 348/734 |

* cited by examiner

*Primary Examiner*—Kieu Vu
*Assistant Examiner*—Patrick F Riegler
(74) *Attorney, Agent, or Firm*—Fish & Richardson P.C.

(57) ABSTRACT

A computer program product may include instructions that, when executed, cause a processor to perform operations that include monitoring an electronic device to determine whether the electronic device is in a specific state. The electronic device may define one or more hotkeys, and each hotkey may correspond to an input from one or more input components of the electronic device. If the electronic device is in the specific state, a rule associated with the specific state may be retrieved, and one or more hotkeys may be enabled or disabled based on the retrieved rule. In some implementations, enabling or disabling one or more hotkeys includes enabling or disabling one or more operations associated with corresponding one or more hotkeys.

22 Claims, 7 Drawing Sheets

| FILTER | HOTKEY | PRIORITY | GROUP | FLAG | OPERATION | USER-OVERRIDE |
|---|---|---|---|---|---|---|
| System | HOTKEY_1 | 1 | A | Disabled | OPERATION_1A | --- |
| Application A | HOTKEY_1 | 2 | B | Enabled | OPERATION_1B | --- |
| --- | HOTKEY_2 | --- | B | Enabled | OPERATION_2 | --- |
| --- | HOTKEY_3 | --- | B | Enabled | OPERATION_3 | Disabled |
| --- | HOTKEY_4 | --- | B | Enabled | OPERATION_4 | --- |
| --- | HOTKEY_5 | 1 | E, C | Disabled | OPERATION_5 | --- |
| --- | HOTKEY_6 | 1 | E, C | Disabled | OPERATION_6 | --- |
| --- | HOTKEY_7 | --- | E, D | Disabled | OPERATION_7 | --- |
| --- | HOTKEY_8 | --- | E, D | Disabled | OPERATION_8 | --- |
| --- | HOTKEY_9 | --- | E, D | Disabled | OPERATION_9 | --- |

FIG. 1D

ENABLING AND DISABLING HOTKEYS

TECHNICAL FIELD

This document generally relates to input and output systems.

BACKGROUND

A user of an application program running on a computing device (e.g., a word processing program) may interact with the application program through one or more input devices, such as a keyboard or a pointing device. By entering specific input, the user may cause the application program ("application") to perform specific functions, such as opening a document, receiving text input in the document, formatting the entered text, saving the document and exiting the application. For example, to save a document that is currently open, a user may employ a pointing device to open a drop-down menu in a user interface window associated with the application, then select a "save" function from the drop-down menu.

Some applications may provide several methods of performing a given function. Some of the methods may be keyboard "shortcuts" that allow the user to perform the function by, for example, concurrently selecting two or more keys. For example, the user may be able to invoke the "save" function of an application by entering a combination of keys, such as "Command" and 'S,' or "CTRL" and 'S.' In addition to shortcuts within a specific application, a computing system may receive concurrent input from one or more input devices that correspond to "hotkeys" defined in the computing system. The hotkeys may cause the computing system to perform actions either inside or outside of the currently active application.

Hotkeys may be used to control various physical aspects of a computing device or various aspects related to an operating system running on the computing device. For example, an input device, such as a keyboard, may include specialized keys or buttons that, for example, mute or adjust volume associated with an audio output device. As another example, a slider control on an expanded keyboard may allow a user to control magnification of a view of a window associated with an application. As another example, an expanded keyboard may provide a number of user-configurable buttons that may be associated with various system or application program operations (e.g., buttons that control display brightness; open or close a CD/DVD tray; or launch a particular program, such as an email client, etc.). As another example, a hotkey may be used to invoke or control an operating system function, such as, for example, to open a task management interface, to open or control a memory manager or monitor, to open or control a CPU performance monitor, to open a registry interface, etc.

Application developers may enable or disable certain hotkeys during operation of an application (e.g., to improve an overall user experience of the application or to improve system stability). For example, a presentation application that uses a full display screen may be programmed to disable system hotkeys associated with, for example, closing the application. If an application that disables hotkeys crashes without properly restoring the hotkeys' previous state, a substantial loss of functionality may result. Similarly, if an application that enables specialized hotkeys, particularly hotkeys that may not be properly coded or configured, and the application crashes before properly disabling the specialized hotkeys, the computing system may be less stable or predictable.

SUMMARY

This document generally relates to methods, apparatus and computer program products for enabling or disabling hotkeys or operations associated with hotkeys. "Hotkey," as used herein, may refer to a specific input or set of concurrent inputs from one or more input devices that, when enabled, may cause an operation to be performed either within a currently active application on a computing system, within another background application or process running on the computing system, or on the computing system itself (e.g., on physical computing system hardware or on an operating system or background processing running on the computing system); thus, as used herein, the term "hotkey" includes the concept of an application shortcut, and may correspond to input from any input device or combination of input devices (e.g., pointing device, touch screen, voice command processor, keyboard, etc.). Moreover, "hotkey" may refer both to the specific input or set of concurrent inputs, or to an operation associated with the specific input or set of concurrent inputs that is to be performed if the hotkey is enabled. In some implementations, system state for a computing system may be monitored, and hotkeys may be automatically enabled or disabled based on the system state. In some implementations, a user may manually disable hotkeys. Hotkeys may be grouped to facilitate concurrent processing of multiple hotkeys, and the hotkey groups may be nested or arranged in a hierarchy.

This document hereby incorporates by reference application Ser. No. 11/020,875, entitled "Window Server Event Taps," client reference P3581, which was filed on Dec. 22, 2004, by Michael James Paquette.

In one general aspect, a computer-implemented method of controlling hotkeys may include associating, in a computing system that runs two or more application programs and that defines a set of hotkeys, the set of hotkeys with a first application program. System state of the computing system may be monitored to determine whether the first application is a foreground application, and if the first application is a foreground application, the set of hotkeys may be disabled. The computer-implemented method may further include enabling the set of hotkeys if the first application is not the foreground application.

In some implementations, each hotkey may include a keyboard shortcut, and the keyboard shortcut may include concurrent input from two or more keyboard keys; in some implementations, each hotkey may include specific input from one or more input devices; in some implementations, each hotkey may include two or more inputs that are simultaneously active, where the inputs are provided by at least one of a keyboard, a mouse, a trackball, a stylus, a touch screen or a voice-command processor.

In another general aspect, a computer-implemented method of enabling and disabling hotkeys may include determining whether a computing device is in a specific system state; retrieving a rule associated with the specific system state, if the computing device is in the specific system state; and enabling or disabling one or more operations associated with one or more hotkeys, based on the retrieved rule.

In another general aspect, a computer-implemented method of processing a hotkey operation in a computing device may include receiving input corresponding to a hotkey from one or more input devices; determining whether a group comprising the hotkey is enabled; and if the group is enabled, initiating an operation associated with the hotkey. The computer-implemented method may further include determining a system state corresponding to the received input.

In some implementations, initiating the operation includes retrieving a rule associated with the hotkey and the determined system state, and causing a processor to execute a set of instructions based on the retrieved rule. In some implementations, initiating the operation includes issuing an event to a processor. The event may include an interrupt or an exception.

In another general aspect, a computer program product may include instructions that, when executed, cause a processor to perform operations that include receiving input in a computing system from one or more input devices; determining whether the received input corresponds to a defined and enabled hotkey; appropriately processing the received input, if the received input does not correspond to a defined and enabled hotkey; and if the received input corresponds to a defined and enabled hotkey, initiating an event associated with the defined hotkey.

In some implementations, determining whether the received input corresponds to a defined and enabled hotkey includes comparing the received input to stored hotkey entries and determining if the received input corresponds to a specific entry. The computer program product may further cause a processor to determine whether the specific entry is enabled. In some implementations, initiating the event comprises identifying an operation associated with the defined and enabled hotkey and performing the operation. The operation may include at least one of issuing an interrupt to a processor, issuing an exception to a processor, executing specific instructions associated with the operation, setting or clearing a flag in the computing system, or reporting detection of the hotkey to a component of the computing system.

In another general aspect, a computer program product may include instructions that, when executed, cause a processor to perform operations that include monitoring an electronic device to determine whether the electronic device is in a specific state. The electronic device may define one or more hotkeys, and each hotkey may correspond to an input from one or more input components of the electronic device. If the electronic device is in the specific state, a rule associated with the specific state may be retrieved, and one or more hotkeys may be enabled or disabled based on the retrieved rule. In some implementations, enabling or disabling one or more hotkeys includes enabling or disabling one or more operations associated with corresponding one or more hotkeys.

In another general aspect, a system for managing hotkey events within an electronic device may include an input controller that receives input from one or more input components associated with an electronic device; a monitor that monitors a state of the electronic device; a hotkey manager that stores hotkey definitions for defined hotkeys, hotkey operations associated with the defined hotkeys and status for each hotkey event, where the status indicates whether a corresponding hotkey operation is enabled or disabled; and an enabler and disabler engine that modifies status of one or more hotkey operations based on the monitored state of the electronic device.

In some implementations, the hotkey manager determines whether received input corresponds to a defined and enabled hotkey, forwards received input to an input processing component of the electronic device if the received input does not correspond to a defined and enabled hotkey, and causes an operation associated with the defined hotkey to be performed if the received input corresponds to a defined and enabled hotkey.

In some implementations, state may include a state of one or more of an input, an output, an operating system, or an application or process. The state of an input may include a current input-component focus, or input that is currently being received by one or more input components. The state of an output may include output that is currently displayed in an output device. The state of the operating system may include current operating system processes that are running on the device or system. The state of an application or process may include a current mode of an application or process, or whether the application or process is a foreground application or process.

Advantages of the systems and techniques described herein may include any or all of the following. Computing system stability may be improved; in particular, the effect on hotkey functionality of application crashes or application bugs may be mitigated. Hotkeys may be managed with little or no user interaction. An overall user experience of a computing system, and of the applications running on the computing system, may be enhanced. Security or usability of a computing system may be improved. Hotkeys may be managed in groups and in hierarchies.

The general and specific aspects may be implemented using a system, a method, or a computer program, or any combination of systems, methods, and computer programs. The details of one or more embodiments are set forth in the accompanying drawings and the description below.

DESCRIPTION OF DRAWINGS

These and other aspects will now be described in detail with reference to the following drawings.

FIG. 1D illustrates example entries that may appear in a summary status table used to track parameters associated with hotkeys.

Like reference symbols in the various drawings indicate like elements.

DETAILED DESCRIPTION OF EXEMPLARY EMBODIMENTS

This document generally relates to methods, apparatus and computer program products for enabling or disabling hotkeys or operations associated with hotkeys. "Hotkey," as used herein, may refer to a specific input or set of concurrent inputs from one or more input devices that, when enabled, may cause an operation to be performed either within a currently active application on a computing system, within another background application or process running on the computing system, or on the computing system itself (e.g., on physical computing system hardware or on an operating system or background processing running on the computing system); thus, as used herein, the term "hotkey" includes the concept of an application shortcut, and may correspond to input from any input device or combination of input devices (e.g., pointing device, touch screen, voice command processor, keyboard, etc.). Moreover, "hotkey" may refer both to the specific input or set of concurrent inputs, or to an operation associated with the specific input or set of concurrent inputs that is to be performed if the hotkey is enabled. In some implementations, system state for a computing system may be monitored, and hotkeys may be automatically enabled or disabled based on the system state. In some implementations, a user may manually disable hotkeys. Hotkeys may be grouped to facilitate concurrent processing of multiple hotkeys, and the hotkey groups may be nested or arranged in a hierarchy.

Figure 1A:
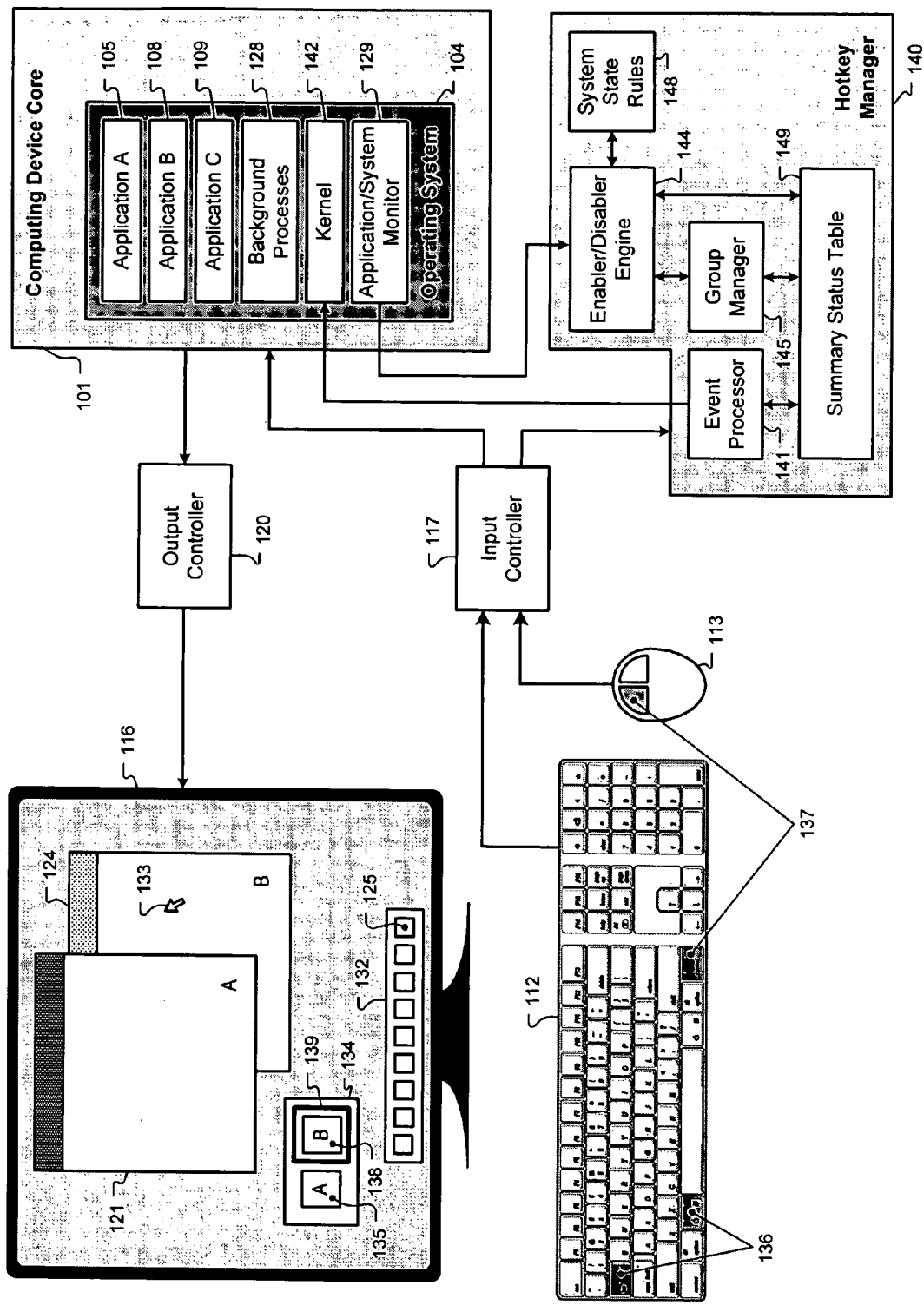
FIG. 1A is a block diagram of a computing system in which hotkeys may be enabled or disabled.

FIG. 1A is a block diagram of a computing system 100 in which hotkeys may be enabled or disabled. As shown, the computing system 100 includes a computing device core 101 (e.g., processor, memory, storage devices—see FIG. 5), which runs an operating system 104 and various applications 105, 108 and 109. A user may interact with the computing system 100, and with the applications 105, 108 and 109 running on the computing system, through various input devices or components, such as a keyboard 112 and a pointing device 113 (e.g., a mouse, trackball or tablet and stylus), and through various output devices, such as a display screen 116. An input controller 117 and an output controller 120 couple the computing device core 101 to the input devices and output devices, respectively.

Various applications running within the computing device core 101 may have corresponding windows or icons in the display screen 116, through which a user may interact with the applications. For example, Application A 105 may display a window 121 in the display screen 116; Application B 108 may display a window 124 in the display screen 116; and Application C 109 may display an icon 125 in the display screen 116.

Some applications may run on the computing device core 101 without displaying corresponding windows or icons in the display screen 116. For example, various background processes 128 may run as part of the operating system 104. A specialized background process, for example, an application/system monitor 129, may monitor the overall state of the computing device 100. For example, the application/system monitor 129 may track which applications are running and various information about those applications, as well as information about the general state of the computing device core 101. State of the computing device core 101, or of the computing device 100 in general, may include, for example, background processes 128 that are currently running; application programs 105, 108 or 109 that are currently running; operating states of running application programs; whether an application program or process is the foreground application or process; application programs 105 and 108 that have corresponding windows 121 and 124 currently displayed in the display screen 116; whether a window 121 or 124 is to be associated with a specific state or operation when it is in the foreground; whether a window 121 or 124 is to be associated with a specific state or operation when it is displayed either in the foreground or the background; whether a window, application or process is to be associated with a specific state or operation when it has the focus of an input device; whether a current user is to be associated with a state or set of states; whether a control panel 132 (described below) is currently displayed; whether the computing system 100 is currently receiving input from input devices; various implementation parameters of a hotkey manager 140 (described below); whether an application has unexpectedly terminated (e.g., "crashed") and, if so, state information associated with the unexpected termination; or various parameters related to the operating system, such as operating system application or task information.

Background processes may provide windows, icons or control panels with which a user may organize, launch and control various applications. For example, the computing device 100 may display a control panel 132 (e.g., a dashboard or a "dock"), from which users may quickly launch applications. In addition to displaying applications that may be launched, the control panel 132 may display icons representing application programs that are currently active but that have windows in the display screen 116 that are minimized, such as the icon 125 that represents Application C 109.

Applications that run in the computing device core 101 may have various states. For example, as described above, an application may be active (e.g., loaded into dynamic memory and possibly executing tasks) but the application may not have a corresponding window displayed on the screen 116; instead, the application may be associated with a minimized icon, such as the icon 125. As another example, an application may be active, have a corresponding window in the display screen 116, and may be in one of two states: the application may be a "foreground" application, or the application may be a "background" application. As another example, an application may have various operating states, such as an authentication state (e.g., in which a user may be required to enter a password), an input entry state, a processing state, etc.).

"Foreground application," as used herein, may refer to an application that is currently configured to receive certain input, such as input from a keyboard. Such an application may be referred to as having the "keyboard focus" (or "focus" of other input devices) of the computing system 100, meaning any keyboard input that is received is likely to be routed to that application. Moreover, a foreground application may be an application whose corresponding window is displayed on top (i.e., in the "foreground") of other application windows. As shown, application A 105, with its corresponding window 121, is the foreground application.

In contrast, "background application," as used herein, may refer to an active application that has a corresponding window on the screen 116 but that is not the foreground application. For example, as shown, Application B 108, with its corresponding window 124, is a background application. Windows associated with background applications may be physically behind (i.e., in the background) a window associated with the foreground application.

Generally, a user may change the state of an application from background to foreground in one of a number of ways. In some implementations, a user may manipulate the pointing device 113 to control the position of a cursor, or pointer 133, on the screen 116 to be within a visible portion of a desired window. Once the pointer 133 is within the visible portion of the desired window, the user may "click" a button associated with the pointing device 113 to select a corresponding application to activate as the foreground application. For example, since the pointer 133 is shown as being within a visible portion of the window 124, additional input, such as a click from the pointing device 113, may activate the corresponding application B 108 as the foreground application. In some implementations, an application may be activated as a foreground application through input from the keyboard 112. For example, in many systems, the combination of an ALT key (or a CMD key) and a TAB key may cause the computing system to display a window 134 having various icons 135 and 138 that represent the applications that are currently running on the computing device. If a user holds down the ALT key while releasing and subsequently depressing the TAB key, a selector 139 may be advanced. When the user releases both the ALT and the TAB keys, the application corresponding to the current position of the selector 139 may become (or remain) the foreground application.

The combination of two discrete inputs, such as the combination of the ALT and TAB keys that is described above, may be defined as a hotkey. In many systems, hotkeys may be defined to allow a user to efficiently perform various tasks in the computing system. For example, as described above, the "ALT-TAB hotkey" may allow a user to navigate from a first application to a second application, thereby causing the second application to become the foreground application. As shown in FIG. 1A, the two shaded keys 136 may represent a particular hotkey (e.g., CMD-TAB). Other combinations of keys may be defined as other hotkeys. Some hotkeys may be associated with operating system tasks. For example, a hotkey may be used to invoke a memory management or reporting interface, to start or stop an operating system performance monitor, to open a registry interface, or to perform other tasks related to an application program, the operating system or the physical computing device.

As described above, the term "hotkey," as used herein, may refer to specific input or concurrent input from one or more input devices. For example, a combination of input from the keyboard 112 and input from the pointing device 113, such as the combination 137 of the shaded key and the shaded button on the pointing device 113 (e.g., CTRL-click), may be associated with a hotkey.

A computing system in which hotkeys are defined, such as the system 100, may employ a hotkey manager 140 to process hotkey input. As will be described with reference to various figures, the hotkey manager 140 may associate various hotkeys with various applications in the computing system 100. The hotkey manager 140 may include an event processor 141 that correlates an appropriate system operation with each hotkey. When hotkey input is detected, the event processor 141 may cause a corresponding operation to be executed. For example, when the event processor 141 detects the CMD-TAB hotkey 136, the event processor 141 may cause an operation to be executed that changes a background application to a foreground application and vice versa. In some implementations, the event processor 141 may issue instructions to a kernel 142 in the computing device core 101. In some implementations, the event processor 141 may simply report detection of hotkey input to another computing system component, without directly causing the computing system to process the hotkey input.

As will be described in greater detail below, hotkeys may be processed in various ways. For example, hotkeys may be enabled or disabled. To enable or disable hotkeys, the hotkey manager 140 may employ an enabler/disabler engine 144. Hotkeys may be grouped, and hotkeys within a group may be processed together. For example, a group of hotkeys may be collectively enabled or disabled. Hotkeys, or groups of hotkeys, may be configured in a hierarchical manner. For example, a first group of hotkeys and a second group of hotkeys may be organized within a third group; if the third group (top of the hierarchy) is disabled, all hotkeys within the first and second groups may be disabled; on the other hand, if the third group is enabled, the first and second group of hotkeys may be enabled or disabled independently of one another. To group hotkeys, the hotkey manager 140 may employ a group manager 145.

Groups of hotkeys may also be automatically enabled or disabled. That is, the computing device 100 may automatically enable or disable a group of hotkeys based on some aspect of the system state of the computing system 100. For example, in some implementations, the hotkey manager 140 may automatically enable or disable groups of hotkeys based on which application is the foreground application. To automatically enable or disable groups of hotkeys, the hotkey manager 140 may employ system state rules 148 in conjunction with the enabler/disabler engine 144.

To track overall processing of hotkeys, the hotkey manager 140 may maintain a summary status table 149. In some implementations, the summary status table 149 may capture various information about hotkeys, such as hotkeys that are defined in the computing system 100, groups the hotkeys are in, the operations associated with the hotkeys, and the status of the hotkeys or of their corresponding operations (e.g., enabled or disabled). Upon receipt of hotkey input from, for example, the input controller 117, the hotkey manager 140 may analyze the summary status table 149 to determine whether to launch an operation that is associated with the hotkey input.

The functional blocks in the computing system 100 may be arranged differently than they are shown in FIG. 1A. For example, the input controller 117 is shown as a distinct component, separate from the hotkey manager 140. However, the components 117 and 140 may be integrated into a single component, partially integrated, or arranged differently than shown. Similarly, the various other components of the computing device core 101 may be arranged differently. In general, the precise design of the hotkey manager 140 or of the example computing system 100 is not critical to this document and can take any suitable form.

Figure 1B:
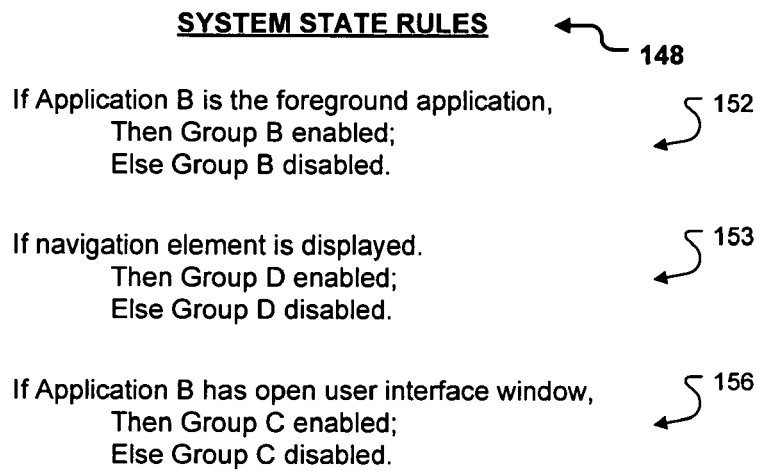
FIG. 1B illustrates several example system state rules that may be used to automatically enable or disable hotkeys or groups of hotkeys.

FIG. 1B illustrates several example system state rules 148 that may be used to automatically enable or disable hotkeys or groups of hotkeys. As shown, an example rule 152 specifies that the "Group B" hotkeys should be enabled if Application B is the foreground application; if Application B is not the foreground application, then the Group B hotkeys are to be disabled.

As a second example, rule 153 specifies that the "Group D" hotkeys are to be enabled if a particular system navigation element is displayed, and disabled if the system navigation element is not displayed. In some implementations, a system navigation element may include the control panel 132; in such a case, Group D hotkeys would be enabled anytime the control panel 132 is displayed on the screen 116. In certain modes, such as a "presentation mode" or "full screen mode," where one of the windows corresponding to an application program completely fills the screen 116, the Group D hotkeys may be disabled (e.g., since the navigation element would not be present). Disabling hotkeys during a presentation mode may prevent inadvertent disruption of the presentation.

As a third example, rule 156 specifies that "Group C" hotkeys are to be enabled when Application B has an open user interface window, and disabled when Application B does not have an open user interface window. Referring to FIG. 1A, window 124 is "open," even though it does not correspond to the foreground application. According to the rule 156, Group C would be enabled, since Application B has an open window. In contrast, icon 125, corresponding to application C 109, is minimized and does not have an open window; if the rule 156 were associated with Application C, rather than with Application B, then Group C hotkeys would be disabled.

Figure 1C:
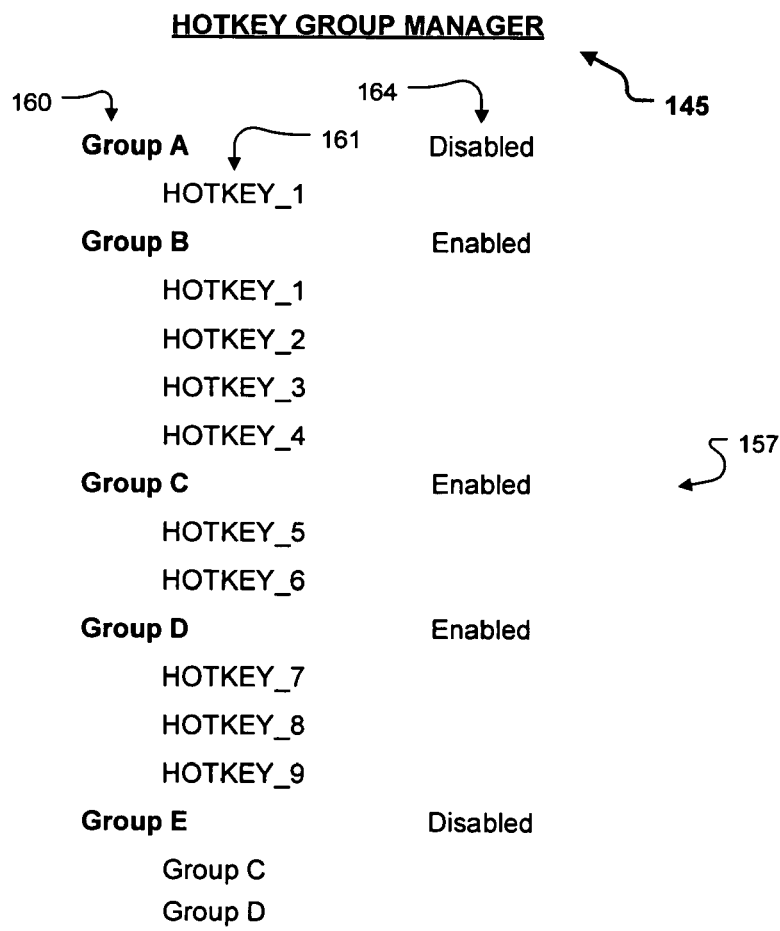
FIG. 1C illustrates example entries in a table that may be used to manage hotkey groups.

FIG. 1C illustrates example entries that may appear in a table 157 in the group manager 145. As shown, the table 157 lists each group 160 of hotkeys, the individual hotkeys 161 corresponding to a group, and a status of the group of hotkeys (e.g., enabled or disabled). As shown, a group may include a single hotkey (e.g., Group A), or a group may include multiple hotkeys (e.g., Group B). A hotkey may be part of more than one group (e.g., HOTKEY_1). In some implementations, a hotkey that appears in more than one group may be associated with multiple operations, depending on context. For example, HOTKEY_1 may be associated with one operation in the context of Group A, and another operation in the context of Group B. Hotkey groups may also include other groups of hotkeys (e.g., Group E). That is, as described above, hotkeys may be arranged hierarchically. The status 164 of a highest-level group in the hierarchy may apply to each hotkey or group of hotkeys in lower levels of the hierarchy.

FIG. 1D illustrates example entries that may appear in a summary status table 149. As shown, the summary status table 149 includes a column 165 of hotkeys and a column 168 of operations corresponding to each hotkey. The operations 168 may be events or operations that occur when the computing system 100 receives hotkey input, and the corresponding hotkey is enabled.

An operation may be a series of instructions that are executed by the kernel 142, or an operation may result in a change in state of some aspect of the computing device 100. In some implementations, the operations may be "published," or "pushed" to an application or a portion of the computing system 100. For example, the operation may cause an interrupt or an exception to be issued to the kernel 142. In some implementations, the operation may be "pulled" from kernel 142 or by a specific operation. For example, an operation may set or clear a flag associated with the computing system 100 or with a specific application, and a component of the computing system 100 or the specific application may periodically poll the flag to determine its state. In some implementations, the operation may simply report detection of hotkey input, or detection of hotkey input associated with an enabled hotkey; that is, in some implementations, the hotkey manager 141 may simply pass hotkey input to another device or computing system component, without directly performing a function or operation associated with the hotkey input.

The table 149 further includes a column 169 of groups with which each hotkey may be associated. In some implementations, as described above, groups may be arranged in hierarchies (e.g., the hotkeys in Groups C and D may also be part of Group E).

The table 149 includes a column 172 of flags associated with each hotkey; individual flags may indicate whether a hotkey is enabled. For example, as shown, HOTKEY_1 is enabled relative to Group B, but HOTKEY_1 is disabled relative to Group A. Whether a hotkey is enabled or disabled may be determined by several factors, including, for example, overall group parameters (see column 164 in FIG. 1C) and system state rules (see table 148 in FIG. 1B). In particular, referring to the rule 156 in FIG. 1B, Group C is shown as enabled, since Application B has an open user interface window (window 124 in FIG. 1A); however, Group E, which includes Group C (see table 145 in FIG. 1C) is disabled; therefore, hotkeys in Groups C, D and E are disabled because of the hierarchy, even though Group C hotkeys would otherwise be enabled.

In some implementations, a hotkey may be associated with a priority, as depicted by the priority column 173. A priority value may allow the hotkey manager 140 to properly handle a hotkey that is common to two distinct groups or operations. For example, as shown, HOTKEY_1 is common to both Group A and Group B, and is associated with either OPERATION_1A or OPERATION_1B, depending on the group. If both Group A and Group B were enabled, the hotkey manager 140 may use the priority flag 173 to determine which operation—OPERATION_1A or OPERATION_1B—to perform. In some implementations, a hotkey may have a priority, even if the hotkey is only associated with a single operation. For example, HOTKEY_5 and HOTKEY_6 are shown as having a priority value of '1,' even though each hotkey is only associated with a single operation. A priority value associated with a hotkey's definition that is not initially "overloaded" (e.g., assigned to two or more operations) may enable the hotkey manager 140 to preserve a priority associated with a specific operation, even if additional operations are subsequently assigned to the hotkey.

A hotkey may further be associated with a filter value, as depicted by the filter column 176. A filter value may focus a hotkey's relevance to, for example, a particular function, application, operating system thread or process, or portion of the computing system 100. For example, OPERATION_1A, associated with HOTKEY_1, may only be relevant to system operations (e.g., operating system background processes 128, rather than processes associated with specific applications). As another example, OPERATION_1B, also associated with HOTKEY_1, may only be relevant to application A.

In some implementations, hotkey input corresponding to enabled hotkeys may be pushed to or pulled from all corresponding applications, regardless of a priority value. For example, in some implementations, if both Group A and Group B were enabled, and the computing system 100 received HOTKEY_1 input, the OPERATION_1A may be pushed to or pulled from the system, and OPERATION_1B may be pushed to or pulled from Application A—regardless of priority. In some implementations, only a single operation (or a number equal to less than the total number of enabled "subscribers") may be pushed to or pulled from an application or system process, based on a priority 173 value. For example, in some implementations, if both Group A and Group B were enabled, and the computing system 100 received HOTKEY_1 input, only the OPERATION_1A may be pushed to or pulled from the system.

In some implementations—independent of a group priority 173, a group 169 or a general flag 172—an individual hotkey may be manually enabled or disabled by user input. As shown, the table 149 includes a user-override column 177 that may cause one or more hotkeys to be enabled or disabled, independent of the status or group of which the hotkey is a member. For example, HOTKEY_3 is shown as disabled in the user-override column 177, even though Group B, of which HOTKEY_3 is a member, is enabled. In some implementations, a user-override may only persist for a specific period of time. For example, the hotkey manager 140 may employ system state rules 148 and the enabler/disabler engine 144 to periodically reevaluate and possibly modify user-override values 177—as well as filter values 176, priority values 173, group assignments 169 and status flags 172. In this manner, the hotkey manager 140 may cause the computing system 100 to be more deterministic and resistant to application error or user-configuration error.

Various aspects of the hotkey manager 141 may be user-configurable. For example, each of the system state rules 148, the hotkey group manager 145 and the hotkey status and operation table 149 may have a corresponding configuration window (not shown in the figures) through which a user may customize various aspects of the hotkey manager 140. As one example, a user may override individual hotkey states with a user-override value 177. As another example, a user may enter or modify system state rules 148 through a user interface associated with the hotkey manager 140. As another example, a user may assign or reassign hotkey group assignments and group states (e.g., the assignments and states that are shown in table 157 in FIG. 1C) through a user interface associated with the hotkey manager 140.

Figure 2:
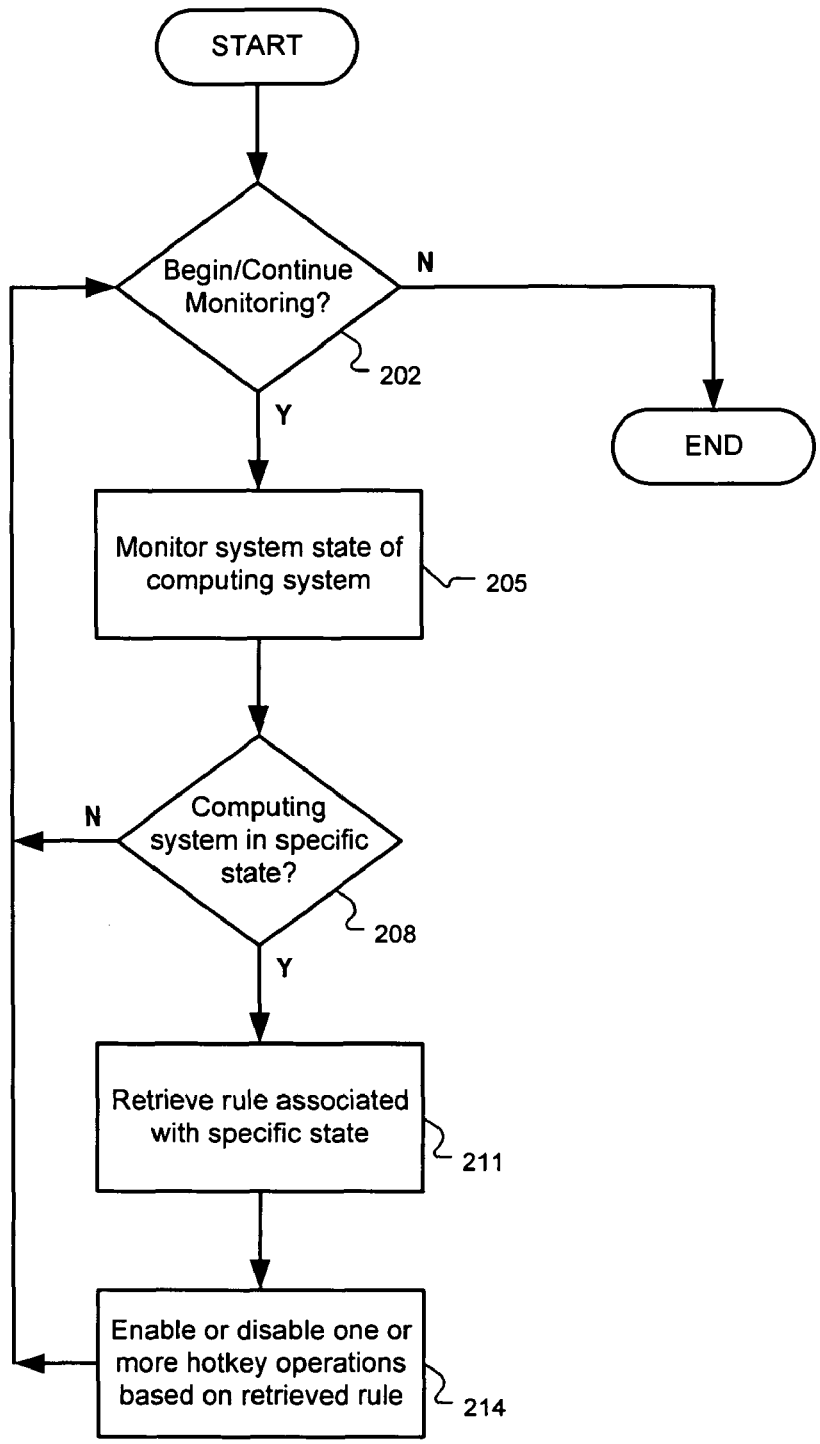
FIG. 2 is a flow diagram illustrating a method that may be used to enable or disable hotkeys or groups of hotkeys.

FIG. 2 is a flow diagram illustrating a method 200 that may be used to enable or disable a hotkey or a group of hotkeys in a computing system. Using the method 200, a computing system may automatically enable or disable hotkeys.

As shown, the method 200 determines (202) whether to begin or continue monitoring the computing system 100, and based on the determination (202), the method 200 monitors (205) system state of the computing system 100. In general, system state may refer to any aspect of the hardware, operating system or application program state of the computing system 100. For example, referring to FIG. 1A, the system state may include background processes 128 that are currently running; application programs 105, 108 or 109 that are currently running; operating states of running application programs; whether an application program or process is the foreground application or process; application programs 105 and 108 that have corresponding windows 121 and 124 currently displayed in the display screen 116; whether a window 121 or 124 is to be associated with a specific state or operation when it is in the foreground; whether a window 121 or 124 is to be associated with a specific state or operation when it is displayed either in the foreground or the background; whether a window, application or process is to be associated with a specific state or operation when it has the focus of an input device; whether a current user is to be associated with a state or set of states; whether a control panel 132 (described below) is currently displayed; whether the computing system 100 is currently receiving input from input devices; various implementation parameters of a hotkey manager 140 (described below); whether an application has unexpectedly terminated (e.g., "crashed") and, if so, state information associated with the unexpected termination; or various parameters related to the operating system, such as operating system application or task information.

If the method 200 detects (208) that the computing system is in a specific state, then a rule associated with that state may be retrieved (211). For example, the application/system monitor 129 may include various "trigger" states that, when detected, may cause the hotkey manager 140 to retrieve a rule from the system state rules 148 corresponding to the detected state. More particularly, the application/system monitor 129 may monitor (205) the computing system 100, detect (208) that a specific system navigation element (e.g., the control panel 132), or another element, is displayed on the display screen 116, and retrieve (211) the rule 153 associated with the detected system navigation input.

Based on the retrieved rule, the method 200 may enable or disable (214) one or more hotkeys operations. For example, based on the retrieved rule 153, the hotkey manager 140 may enable the Group D hotkeys and their corresponding operations. To enable the Group D hotkeys, the hotkey manager 140 may employ the enabler/disabler engine 144 to update, if necessary, the group flags 164 in the table 157 (see FIG. 1C). Updates to the group flags 164 may affect other flags, such as the overall hotkey flags 172 (see FIG. 1D). In this example, the flags 172 are not affected by the enabler/disabler engine 144 update of the flag 164 associated with Group D, since a group higher in the hierarchy (Group E) is disabled.

By enabling or disabling hotkeys based on system state, the hotkey manager may provide the computing system 100 with more stability and determinism. Moreover, the computing system 100 may be more secure and user-friendly. For example, if an application program enables or disables certain hotkeys, then crashes before restoring the hotkeys, performance or functionality of the computing system 100 may be adversely impacted. Similarly, performance or functionality of the computing system 100 may be adversely impacted if application program code that affects or implements hotkeys is corrupted or poorly written. By automatically enabling or disabling hotkeys, the hotkey manager 140 may mitigate impact on performance or functionality by restoring status of hotkeys following an application program crash or following evaluation of corrupted or poorly written programming code.

In some implementations, system state of the computing system 100 may be monitored (205) periodically. For example, the application/system monitor 129 may be scheduled to run periodically with a specific period (e.g., the application/system monitor 129 may run every few seconds, every few minutes, etc.). The period may be user-configurable or may itself depend on system state. In some implementations, system state of the computing device 100 may be monitored (205) in response to certain events. For example, the application/system monitor 129 may run every time a new application is activated, an application terminates (e.g., naturally, or as a result of a "crash"); a window associated with an application is opened, moved or closed; or input is received in the computing system 100.

Figure 3:
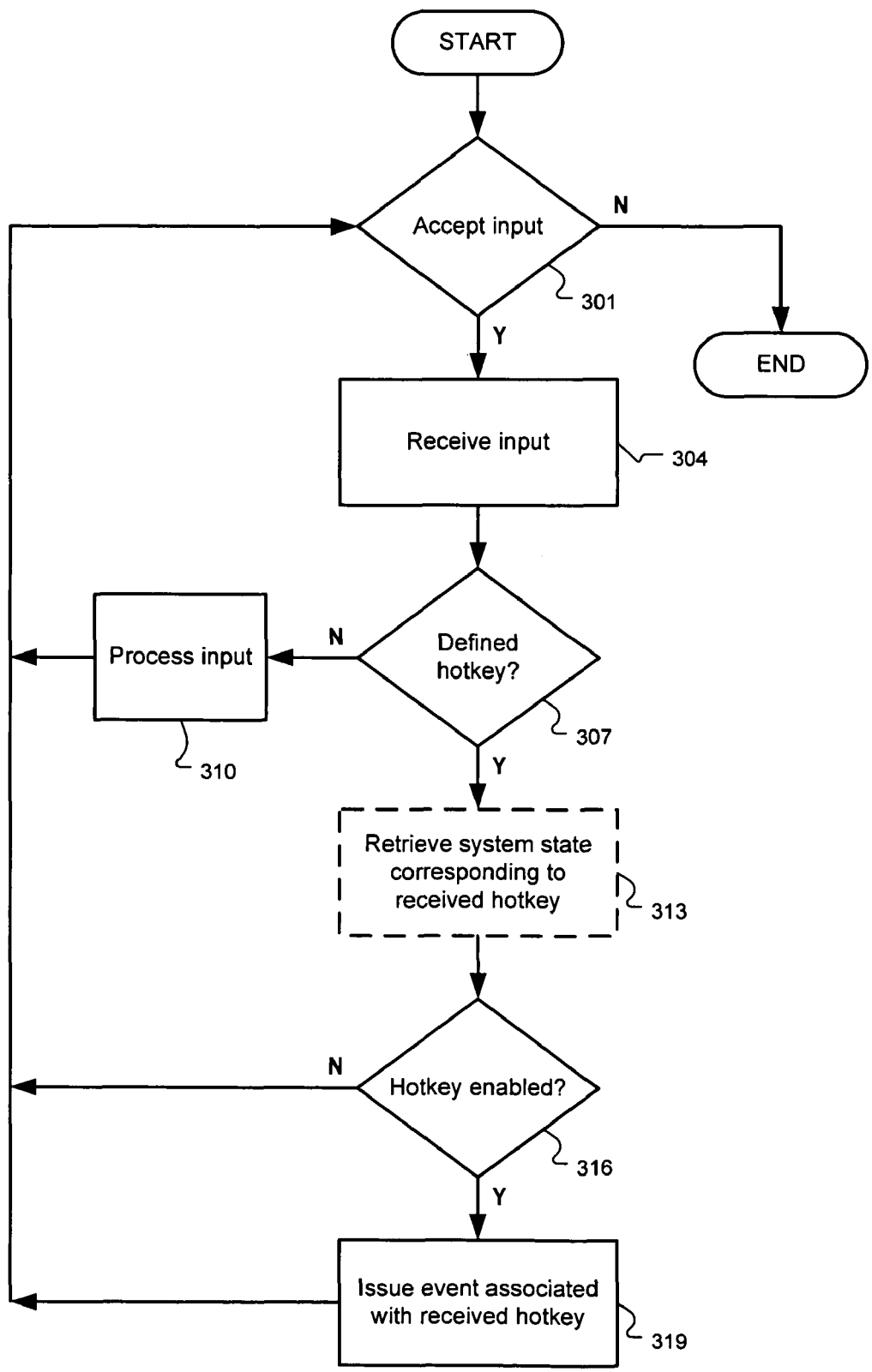
FIG. 3 is a flow diagram illustrating a method that may be used to process hotkeys.

FIG. 3 is a flow diagram illustrating a method 300 that may be used to process hotkey input and other input. Using the method 300, a computing system may perform an operation associated with a hotkey, according to status of the corresponding hotkey.

As shown, the method 300 initially determines (301) whether to accept input. For example, referring to FIG. 1A, the input controller 117 may enable or disable receipt of all input from one or more input devices. If the method 300 is accepting input, then upon receiving (304) input, the method 300 may determine (307) whether the input is a defined hotkey. For example, the input controller 117 may receive discrete input from a single key on the keyboard 112 or input corresponding to movement of the pointing device 113, and the input controller 117 may determine that the received input does not correspond to a defined hotkey. More particularly, the method 300 may compare the received input to entries in the summary and status table 149 to determine whether the received input corresponds to a specific entry. If not, the input controller 117 may then process (310) the non-hotkey input accordingly, such as by forwarding the input to the computing device core 101 for further processing.

As another example, the input controller 117 may receive concurrent multiple input corresponding to a hotkey, such as, for example ALT-TAB 136 input or a CTRL-click 137. The input controller 117 may identify such concurrent multiple input as a hotkey based on entries in the overall status table 149. For example, although the column 165 in FIG. 1D displays hotkeys as "HOTKEY_N," this label may represent actual input, such as an ALT-TAB 136 or a CTRL-click 137. Thus, the table 149 may inherently define the hotkeys and store definitions of the hotkeys. In the example above, a hotkey includes concurrent multiple input (e.g., two discrete but concurrent inputs), but in some implementations, a hotkey may be associated with a single discrete input. For example, a hotkey may be associated with input from a single key or button on the keyboard 112, such as, for example, a multimedia "mute" button, or a view-magnification slider control.

In some implementations, the method 300 may retrieve (313) system state information corresponding to the received hotkey. For example, upon determining (307) that particular received input is a hotkey, the input controller 117 may cause the hotkey manager 140 to obtain system state from the application/system monitor 129. Relevant system state may include, for example, an application program that is currently a foreground application, or an application program that currently has a focus associated with the keyboard 112 or with another input device. In some implementations, system state may be pertinent to "filtering" the relevance of the hotkey (see the filter column 176 in FIG. 1D).

The method 300 may determine (316) whether the hotkey is enabled. If the hotkey is not enabled, the method 300 may not take further action. If the hotkey is enabled, the method 300 may issue (319) an event or otherwise initiate an operation associated with the received hotkey. For example, the hotkey manager 140 may determine (316) whether a received hotkey is enabled by analyzing the summary status table 149. In particular, the event processor 141 may analyze the summary flag 172 associated with a hotkey, and may further analyze whether the summary flag 172 is overridden by a user-override flag 177. If the hotkey is enabled and not subject to a user-override, the event processor 141 may cause a corresponding operation 168 to be performed. As described above, the operation may involve issuing an interrupt or exception to the kernel 142, executing certain instructions in the kernel 142, or setting or clearing a flag in the computing system 100 that may be polled by some other portion of the computing system 100 or by an application program running on the computing system 100. Moreover, the operation may initiate another action, such as reporting detection of hotkey input without directly processing the hotkey input.

Figure 4:
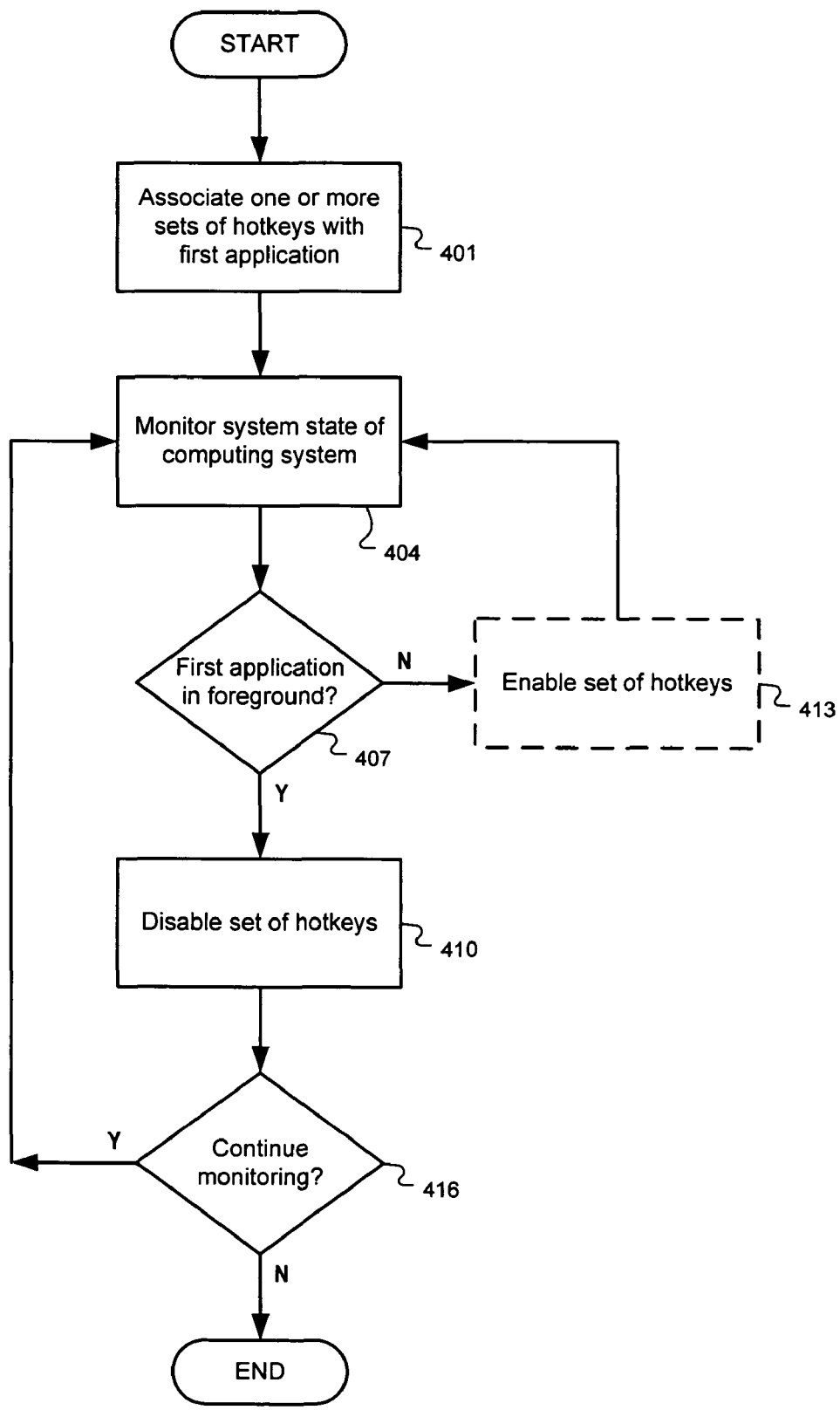
FIG. 4 is a flow diagram illustrating a method that may be used to enable and disable hotkeys based on whether an application program is a foreground application.

FIG. 4 is a flow diagram illustrating a method 400 that may be used to enable and disable hotkeys based on whether an application program is a foreground application. The method 400 provides a specific example of the general method 300 that may be used to process hotkeys.

As shown, the method 400 associates (401) one or more sets of hotkeys with a first application. For example, associations may be made between HOTKEY_1, Group A and a system process; other associations may be made between HOTKEY_1, Group B and Application A. Referring to FIGS. 1A and 1D, a filter value 176 associating a hotkey 165 with an application or with a portion of the computing system 100 may be stored in the summary status table 149. In some implementations, the association may be made automatically, for example, by the hotkey manager 140, which may employ the system state rules 148. In some implementations, the association may be made by a user, employing a user interface corresponding to the hotkey manager 140.

The method 400 monitors (404) system state of the computing system and determines (407) whether the first application is the foreground application. For example, referring to FIG. 1A, the application/system monitor 129 may monitor application state to determine (407) if Application A 105 is the foreground application. If the first application (e.g., Application A) is the foreground application, as shown in FIG. 1A, then the method 400 may disable (410) a set of input device hotkeys. For example, the enabler/disabler engine 144 may disable (410) the Group A hotkeys by modifying values in the table 157 (see FIG. 1C) and the corresponding values in the summary status table 149 (see FIG. 1D).

If the method 408 determines (407) that the first application (e.g., Application A) is not the foreground application, the method 400 may enable (413) a set of hotkeys. For example, the enabler/disabler engine 144 may enable (413) the Group B hotkeys by modifying values in the table 157 and the summary status table 149. In some implementations, as described above, operations corresponding to the hotkeys that are disabled (410) or enabled (413) may be different (e.g., OPERATION_1A and OPERATION_1B) but may be associated with a common hotkey (e.g., HOTKEY_1). In some implementations, operations corresponding to the hotkeys that are disabled (410) or enabled (413) may be the same. For example, system hotkeys, such as media player control hotkeys, may be disabled (410) when an application is the foreground application, and enabled (413) when the application is not the foreground application.

The method 400 may determine (416) whether to continue monitoring the system. In a manner similar to that described with reference to FIG. 3, the method 400 may monitor the computing system 100 in response to specific events (e.g., activation or termination of an application; opening, closing or moving of a user interface window; receipt of input in the computing system; etc.). Or, the method 400 may periodically monitor the computing system 100.

Figure 5:
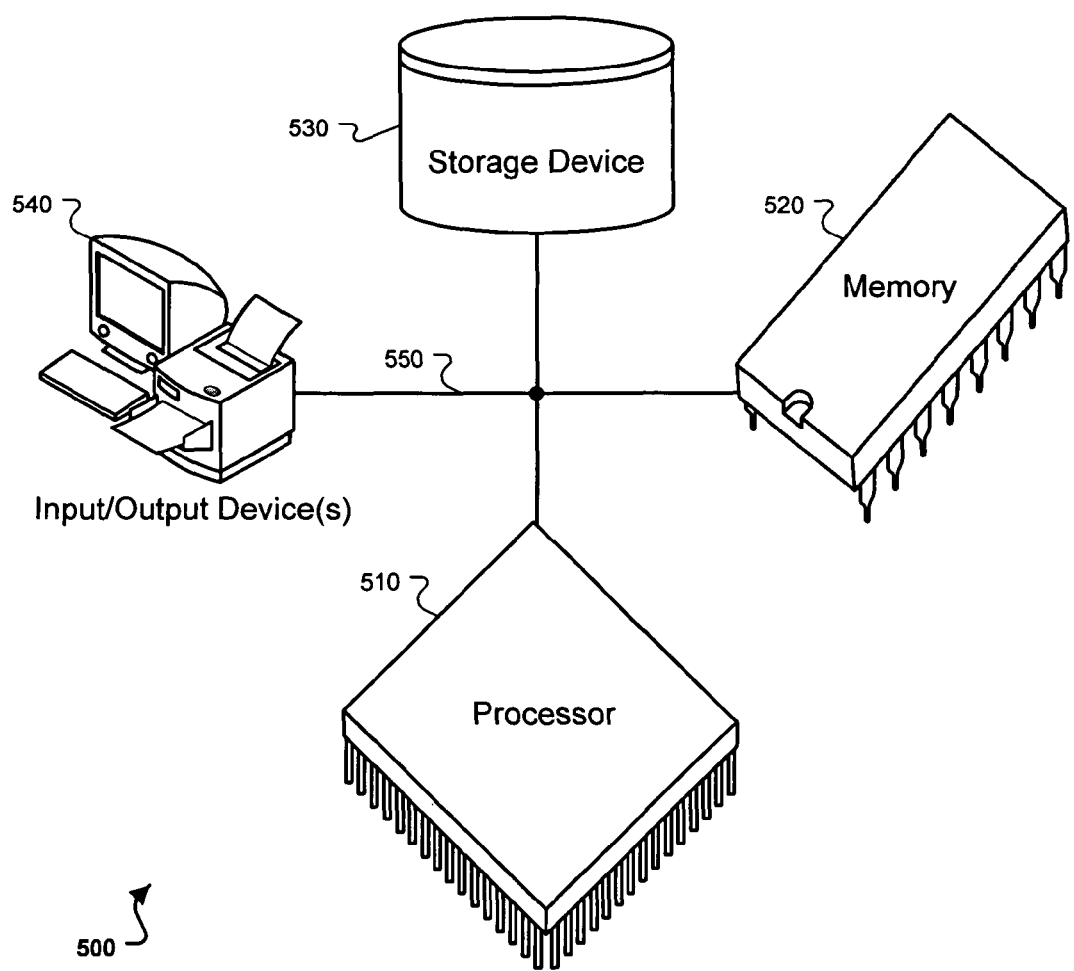
FIG. 5 is a block diagram of a computing device that may be used in the operations described herein.
Figure 1A:
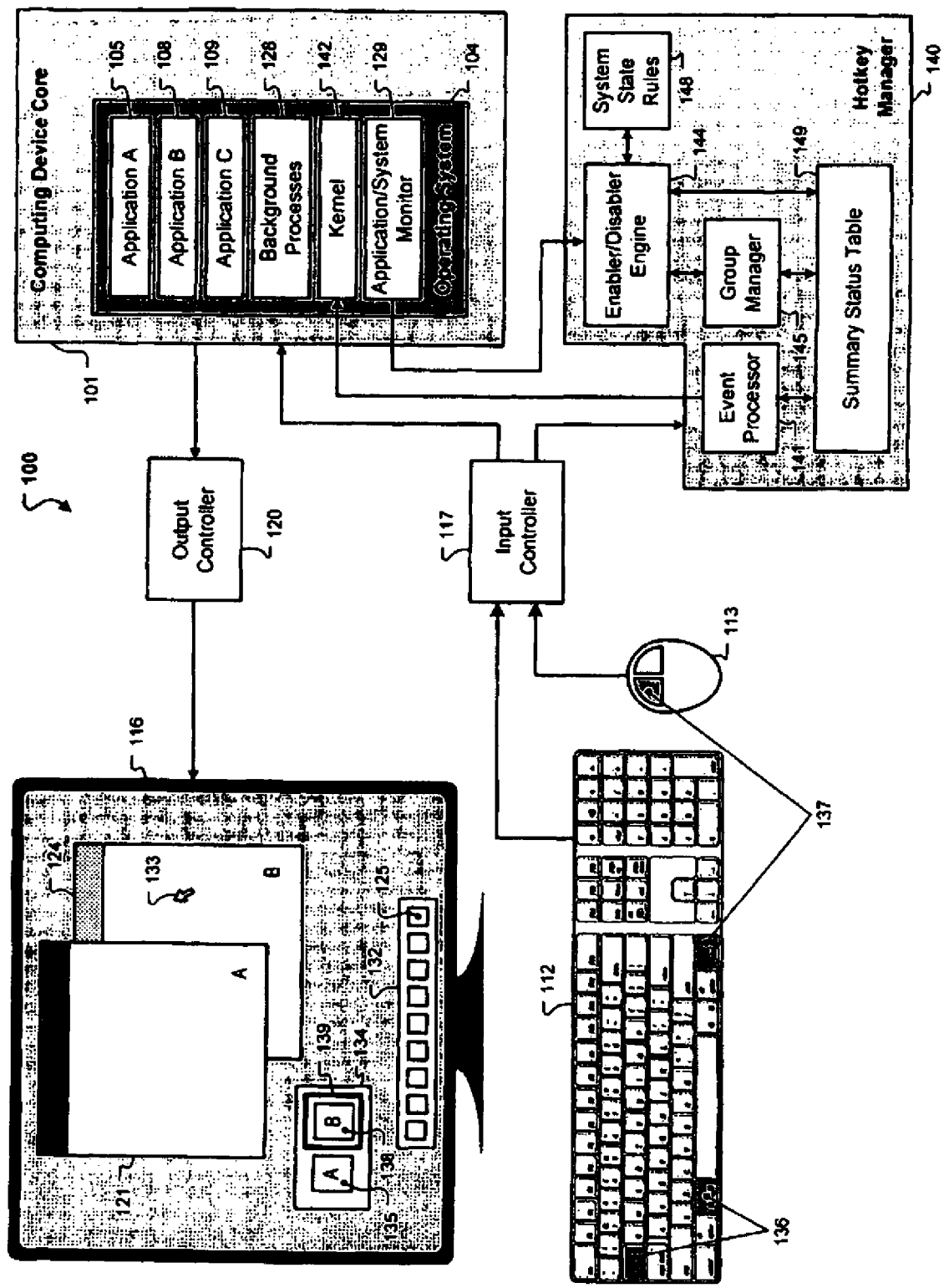
Figure 2:
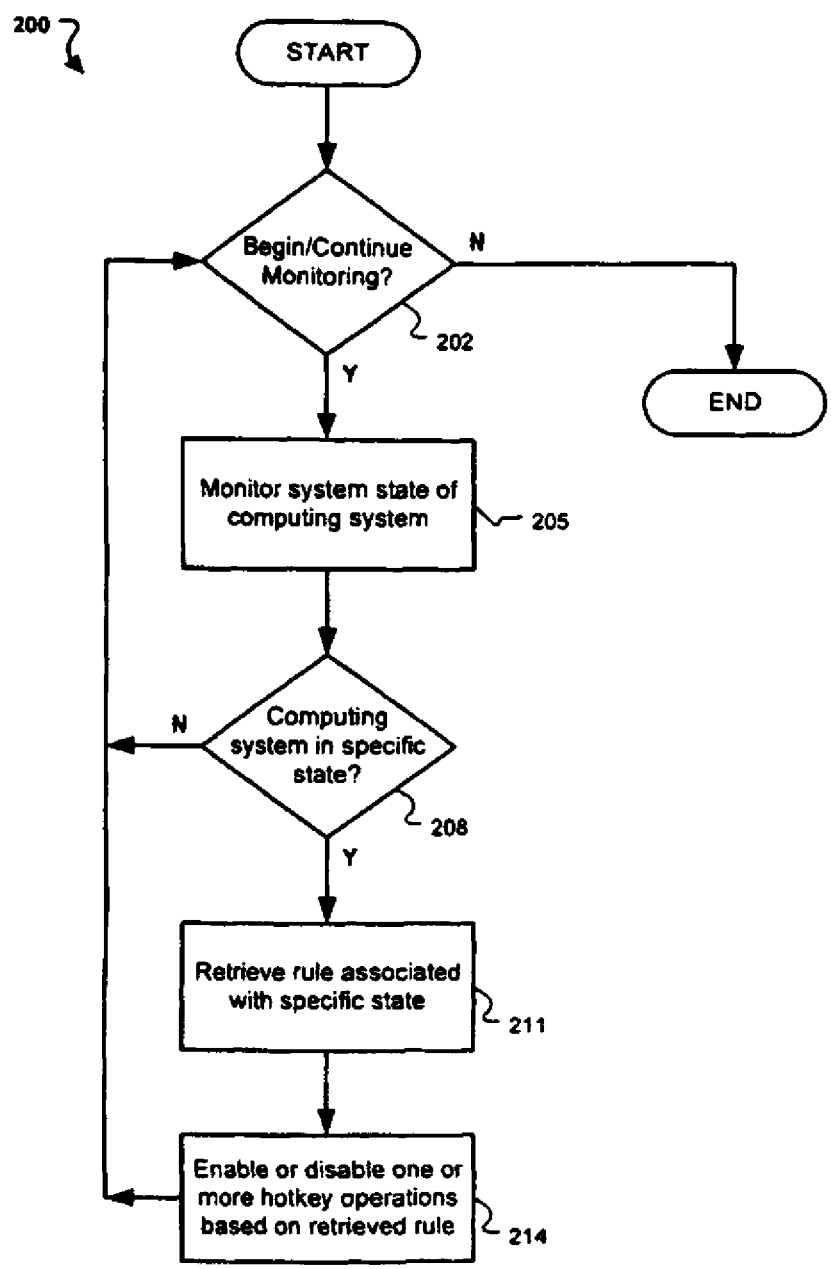
Figure 3:
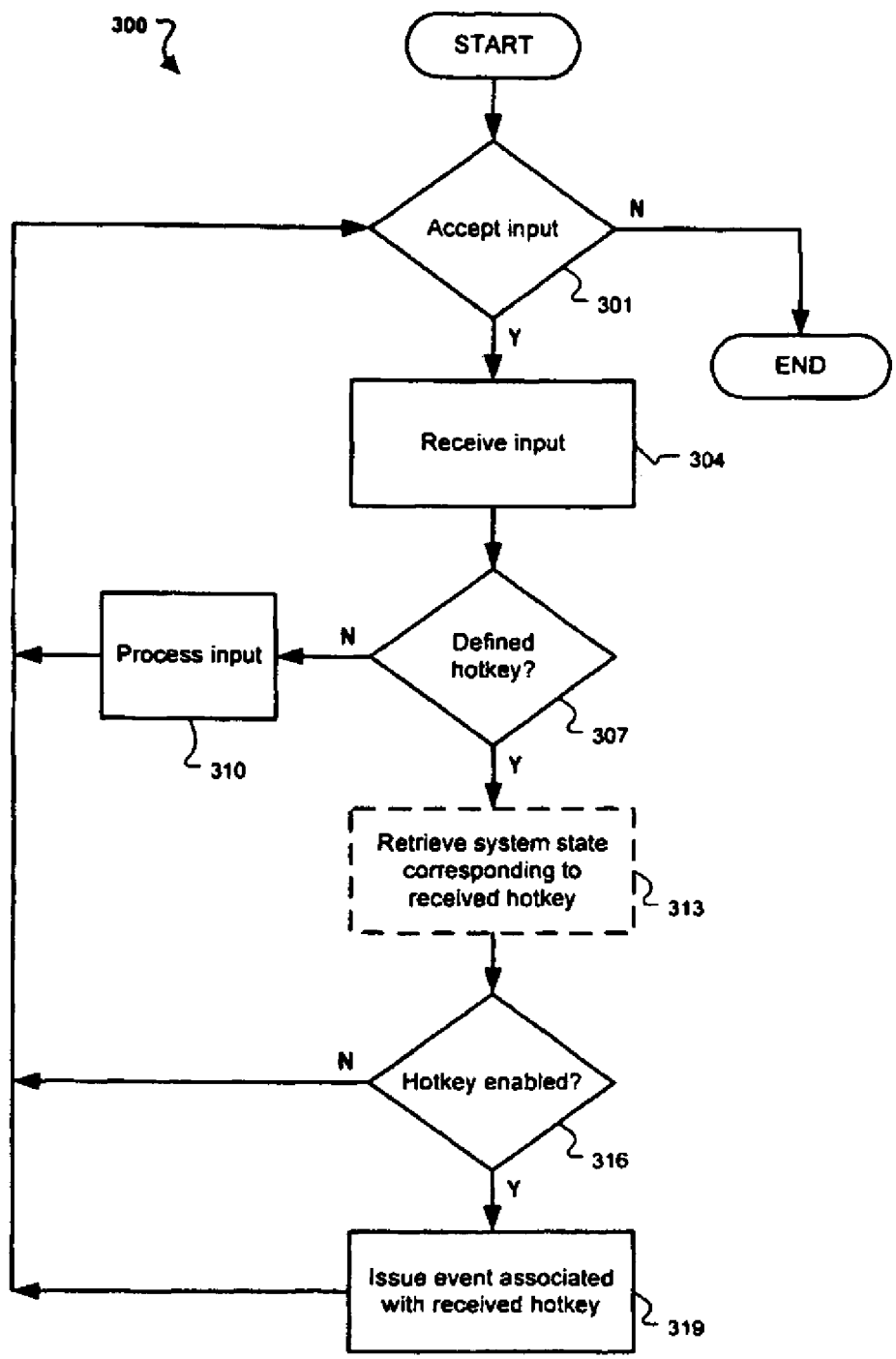
Figure 4:
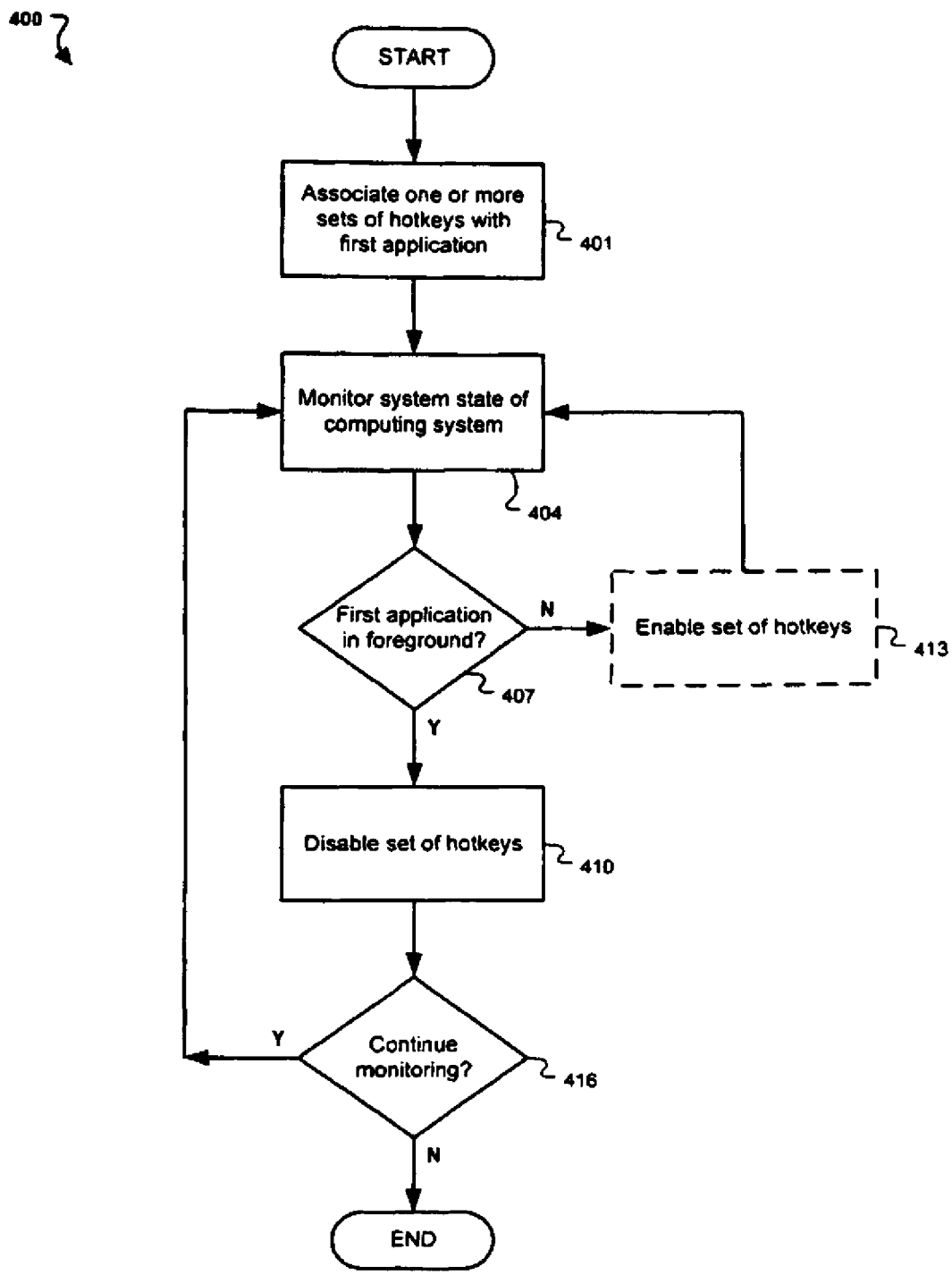

FIG. 5 is a block diagram of a computing device 500 that may be used in the operations described herein. The computing device 500 includes a processor 510, a memory 520, a storage device 530 and an input/output device 540. Each of the components 510, 520, 530 and 540 are interconnected using a system bus 550.

The processor 510 is capable of processing instructions for execution within the computing device 500. In some implementations, the processor 510 is a single-threaded processor. In other implementations, the processor 510 is a multi-threaded processor. The processor 510 is capable of processing instructions stored in the memory 520 or on the storage device 530 to display graphical information for a user interface on the input/output device 540.

The memory 520 stores information within the computing device 500. In some implementations, the memory 520 is a computer-readable medium. In some implementations, the memory 520 is a volatile memory unit. In some implementations, the memory 520 is a non-volatile memory unit.

The storage device 530 is capable of providing mass storage for the computing device 500. In some implementations, the storage device 530 is a computer-readable medium. In various other implementations, the storage device 530 may be a floppy disk device, a hard disk device, an optical disk device, a tape device, or a block of non-volatile memory.

The input/output device 540 provides input/output operations for the computing device 500. In some implementations, the input/output device 540 includes a keyboard component and/or pointing device component. In some implementations, the input/output device 540 includes a display unit for displaying graphical user interfaces.

The methods described herein may be implemented in digital electronic circuitry, or in computer hardware, firmware, software, or in combinations of them. Apparatus may be implemented in a computer program product tangibly embodied in an information carrier, e.g., in a machine-readable storage device or in a propagated signal, for execution by a programmable processor; and actions of the method may be performed by a programmable processor executing a program of instructions to perform functions of the invention by operating on input data and generating output. Implementations may include one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, a computing device may include a display device such as a CRT (cathode ray tube) or LCD (liquid crystal display) monitor for displaying information to the user and a keyboard and a pointing device such as a mouse or a trackball by which the user may provide input to the computer.

Apparatus and methods disclosed herein may be implemented in a computing system that includes a back-end component, such as a data server; or that includes a middleware component, such as an application server or an Internet server; or that includes a front-end component, such as a client computer having a graphical user interface or an Internet browser, or any combination of them. The components of the system may be connected by any form or medium of digital data communication such as a communication network. Examples of communication networks include, e.g., a LAN, a WAN, and the computers and networks forming the Internet.

The computing system may include clients and servers. A client and server are generally remote from each other and typically interact through a network, such as the described one. The relationship of client and server may arise by virtue of computer programs running on the respective computers and having a client-server relationship to each other.

The computing system may be embodied in a portable device, such as a handheld electronic device (e.g., a personal digital assistant) or a mobile communication device (e.g., a cell phone or smartphone). In some implementations, non-volatile memory, such as, for example, flash memory, EEPROM or removable storage media may provide mass storage to the computing system. In some implementations, a mass storage device may be provided outside of the computing system, and data in the mass storage device may be accessible to the computing system via an interface, such as a wireless interface, a wired interface, or a card or device reader interface.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method of controlling hotkeys, the method comprising:
    storing association data and enablement data in a status table, the association data associating a first set of hotkeys with a first application program and a second set of hotkeys with a second application program in a computing system that runs two or more application programs and that defines the first set of hotkeys and the second set of hotkeys, and the enablement data indicating an enabled or disabled status of the sets of hotkeys;
    monitoring, with an operating system process that is independent of each of the two or more application programs, system state of the computing system to determine if the first application or the second application is a foreground application; and
    enabling, from the operating system process, the first set of hotkeys if the first application is the foreground application and disabling the first set of hotkeys if the first application is not the foreground application, and enabling, from the operating system process, the second set of hotkeys if the second application is the foreground application and disabling the second set of hotkeys if the second application is not the foreground application, wherein enabling or disabling a set of hotkeys includes updating the enablement data stored in the status table.

2. The computer-implemented method of claim 1, where each hotkey comprises a keyboard shortcut, the keyboard shortcut comprising concurrent input from two or more keyboard keys.

3. The computer-implemented method of claim 1, where each hotkey comprises specific input from one or more input devices.

4. The computer-implemented method of claim 1, where each hotkey comprises two or more inputs that are simultaneously active, the inputs being provided by at least one of a keyboard, a mouse, a trackball, a stylus, a touch screen or a voice-command processor.

5. A computer-implemented method of enabling and disabling hotkeys, the method comprising:
    periodically determining, from an operating system process that is independent of an application process, whether a computing device is in a specific system state out of a plurality of possible system states;
    wherein periodically determining comprises determining the specific system state in response to events comprising at least one of opening, moving or closing of a graphical user interface window associated with the application process, the graphical user interface window being presented on a display device, and wherein each of the possible system states is associated with a respective rule;
    when the computing device is in the specific system state, retrieving the rule associated with the specific system state, where the rule specifies one or more hotkeys corresponding to the application process that are to be enabled or disabled by the operating system process; and
    enabling or disabling, from the operating system process, one or more operations associated with the one or more hotkeys corresponding to the application process, based on the retrieved rule, wherein enabling or disabling the one or more operations includes updating enablement data stored in a status table.

6. The computer-implemented method of claim 5, where the system state comprises a state of one or more of an input, an output, an operating system, or an application or process; the state of an input comprising a current input-component focus, or input that is currently being received by one or more input components; the state of an output comprising output that is currently displayed in an output device; the state of the operating system comprising current operating system processes that are running on the computing device; the state of an application or process comprising a current mode of an application or process, or whether the application or process is a foreground application or process.

7. A computer-implemented method of processing a hotkey operation in a computing device, the method comprising:
storing association data and enablement data in a status table, the association data identifying groups of hotkeys including a first group of hotkeys corresponding to a first application and a second group of hotkeys corresponding to a second application, and the enablement data indicating an enabled or disabled status of the sets of hotkeys;
periodically determining a state of the computing device with an operating system process distinct from the first application and the second application, and based on the determined state, disabling the first group of hotkeys from the operating system process including updating the status table, while maintaining unchanged an enabled/disabled status of the second group of hotkeys;
receiving input from one or more input devices, the input corresponding to a hotkey in one of the one or more of the groups of hotkeys;
determining from the operating system process whether a group comprising the hotkey is enabled, according to a status for the group as stored in a status table; and
if the group is enabled, initiating an operation associated with the hotkey.

8. The computer-implemented method of claim 7, wherein determining the state of the computing device comprises determining a system state corresponding to the received input.

9. The computer-implemented method of claim 8, where initiating the operation comprises:
retrieving a rule associated with the hotkey and the determined system state; and
causing a processor to execute a set of instructions based on the retrieved rule.

10. The computer-implemented method of claim 8, where initiating the operation comprises issuing an event to a processor.

11. The computer-implemented method of claim 10, where the event comprises an interrupt or an exception.

12. A computer program product, tangibly embodied in a storage device, the computer program product comprising instructions that, when executed, cause a processor to perform operations comprising:
storing association data and enablement data in a status table accessible to an operating system process, the association data defining a first group of hotkeys corresponding to a first application process and a second group of hotkeys corresponding to a second application process, and the enablement data indicating an enabled or disabled status of the hotkeys;
periodically determining, in the operating system process, a state of a computing system, and based on the determined state, enabling or disabling one or more hotkeys in the first group of hotkeys; wherein periodically determining comprises determining the state in response to events comprising at least one of opening, moving or closing of a graphical user interface window associated with the first application process, the graphical user interface window being presented on a display device, where the operating system process is distinct from the first application process, and enabling or disabling a hotkey includes updating the enablement data stored in the status table;
receiving input in the computing system from one or more input devices;
determining whether the received input corresponds to a defined and enabled hotkey;
appropriately processing the received input, if the received input does not correspond to a defined and enabled hotkey; and
if the received input corresponds to a defined and enabled hotkey, initiating an event associated with the defined hotkey.

13. The computer program product of claim 12, where determining whether the received input corresponds to a defined and enabled hotkey comprises comparing the received input to stored hotkey entries and determining if the received input corresponds to a specific entry.

14. The computer program product of claim 13, further comprising determining whether the specific entry is enabled.

15. The computer program product of claim 12, wherein initiating the event comprises identifying an operation associated with the defined and enabled hotkey and performing the operation.

16. The computer program product of claim 15, wherein the operation comprises at least one of issuing an interrupt to a processor, issuing an exception to a processor, executing specific instructions associated with the operation, setting or clearing a flag in the computing system, or reporting detection of the hotkey to a component of the computing system.

17. A computer program product, tangibly embodied in a storage device, the computer program product comprising instructions that, when executed, cause a processor to perform operations comprising:
monitoring an electronic device to periodically determine whether the electronic device is in a specific state out of a plurality of possible system states, the electronic device including a definition of one or more sets of hotkeys, each hotkey corresponding to an input from one or more input components of the electronic device and associated with one or more application programs, the sets of hotkeys including a first set associated with a first application program and a second set associated with a second application program, wherein monitoring comprises monitoring with an operating system process that is independent of each of the one or more application programs, wherein periodically determining comprises determining a state of the electronic device in response to events comprising at least one of opening, moving or closing of a graphical user interface window associated with the first application program, the graphical user interface window being presented on a display device, and wherein each of the possible system states is associated with a respective rule;
if the electronic device is in the specific state, retrieving a rule associated with the specific state, where the rule specifies one or more of the first set of hotkeys that are to be enabled or disabled by the operating system process; and
enabling or disabling, from the operating system process, the one or more of the first set of hotkeys based on the retrieved rule, wherein enabling or disabling the one or more of the first set of hotkeys includes updating enablement data stored in a status table.

18. The computer program product of claim 17, where enabling or disabling one or more hotkeys comprises enabling or disabling one or more operations associated with corresponding one or more hotkeys.

19. The computer program product of claim 17, where the specific state comprises a state of one or more of an input, an output, an operating system, or an application or process; the state of an input comprising a current input-component focus, or input that is currently being received by one or more input components; the state of an output comprising output that is currently displayed in an output device; the state of the operating system comprising current operating system processes that are running on the electronic device; the state of an application or process comprising a current mode of an application or process, or whether the application or process is a foreground application or process.

20. A system for managing hotkey events within an electronic device, the system comprising:

an electronic device having one or more input components;

an input controller that receives input from the one or more input components;

a monitor that monitors a state of the electronic device;

a hotkey manager that stores hotkey definitions for defined hotkeys, hotkey operations associated with the defined hotkeys, and a status table with association and enablement data for each hotkey operation, where the defined hotkeys include a first set of hotkeys and a second set of hotkeys, where the association data associates the first set of hotkeys with a first application program and the second set of hotkeys with a second application program and the enablement data indicates an enabled or disabled status of the sets of hotkeys based on the state of the electronic device; and an enabler and disabler engine that enables the first set of hotkeys when the electronic device is in a first state and disables the first set of hotkeys when the electronic device is in a different second state, wherein enabling or disabling a hotkey operation includes updating the enablement data stored in the status table.

21. The system of claim 20, where the state of the electronic device comprises a state of one or more of an input, an output, an operating system, or an application or process; the state of an input comprising a current input-component focus, or input that is currently being received by one or more input components; the state of an output comprising output that is currently displayed in an output device; the state of the operating system comprising current operating system processes that are running on the electronic device; the state of an application or process comprising a current mode of an application or process, or whether the application or process is a foreground application or process.

22. The system of claim 20, where the hotkey manager determines whether received input corresponds to a defined and enabled hotkey, forwards received input to an input processing component of the electronic device if the received input does not correspond to a defined and enabled hotkey, and causes an operation associated with the defined hotkey to be performed if the received input corresponds to a defined and enabled hotkey.

* * * * *

UNITED STATES PATENT AND TRADEMARK OFFICE
CERTIFICATE OF CORRECTION

PATENT NO. : 7,757,185 B2  
APPLICATION NO. : 11/327839  
DATED : July 13, 2010  
INVENTOR(S) : Michael James Paquette et al.

Page 1 of 5

It is certified that error appears in the above-identified patent and that said Letters Patent is hereby corrected as shown below:

On Sheet 1 of 7, in Figure 1A, line 1, above "Box No. 120" insert --  $\overbrace{\phantom{xx}}^{100}$  --.

On Sheet 4 of 7, in Figure 2, line 1, left of the "Start" bubble, insert --  $200\,\}$  --.

On Sheet 5 of 7, in Figure 3, line 1, left of the "Start" bubble, insert --  $300\,\}$  --.

On Sheet 6 of 7, in Figure 4, line 1, left of the "Start" bubble, insert --  $400\,\}$  --.

Signed and Sealed this  
Twenty-eighth Day of August, 2012

David J. Kappos  
*Director of the United States Patent and Trademark Office*